United States Patent [19]
Mattarella et al.

[11] Patent Number: 6,089,641
[45] Date of Patent: *Jul. 18, 2000

[54] PASSENGER VEHICLE FLOOR AND SEAT ARRANGEMENT

[75] Inventors: Bruce P. Mattarella, Canton; Charles E. Harland, Livonia, both of Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/997,636

[22] Filed: Dec. 23, 1997

[51] Int. Cl.$^7$ .................................................. B60N 2/00
[52] U.S. Cl. ...................... 296/64; 296/65.01; 296/65.05; 296/65.16
[58] Field of Search .................................. 296/64, 65.01, 296/65.05, 65.16, 69, 210, 3

[56] References Cited

U.S. PATENT DOCUMENTS

| | | |
|---|---|---|
| D. 76,811 | 11/1928 | Kashian . |
| D. 203,038 | 11/1965 | Wozena . |
| D. 223,103 | 3/1972 | Harvey, Jr. . |
| D. 249,495 | 9/1978 | Wallace et al. . |
| D. 262,099 | 12/1981 | Harding . |
| 324,232 | 8/1885 | Clarkson . |
| 1,542,785 | 6/1925 | Frick . |
| 2,068,505 | 1/1937 | Morrison . |
| 2,926,948 | 3/1960 | Koplin et al. . |
| 3,113,801 | 12/1963 | Caley . |
| 3,171,682 | 3/1965 | Buser et al. . |
| 3,328,069 | 6/1967 | Dumas . |
| 3,635,521 | 1/1972 | Shivvers . |
| 3,703,310 | 11/1972 | Lystad . |
| 3,825,297 | 7/1974 | Barenyi . |
| 3,973,799 | 8/1976 | Berg . |
| 4,010,979 | 3/1977 | Fisher, III et al. . |
| 4,191,417 | 3/1980 | Ferrara . |
| 4,194,782 | 3/1980 | Itoh . |
| 4,206,946 | 6/1980 | Maertens . |
| 4,227,736 | 10/1980 | Lebault et al. . |
| 4,268,086 | 5/1981 | Okuyama . |
| 4,286,819 | 9/1981 | Inoue et al. . |
| 4,368,916 | 1/1983 | Blasin . |
| 4,475,763 | 10/1984 | Hamatani et al. . |
| 4,475,769 | 10/1984 | Crawford et al. . |
| 4,484,776 | 11/1984 | Gokimoto et al. . |
| 4,512,609 | 4/1985 | Pärsson . |
| 4,518,201 | 5/1985 | Wahlmann et al. . |
| 4,533,175 | 8/1985 | Brennan . |
| 4,573,225 | 3/1986 | Wolf . |
| 4,627,656 | 12/1986 | Gokimoto et al. . |
| 4,634,180 | 1/1987 | Zaveri et al. . |
| 4,637,081 | 1/1987 | Clark . |
| 4,669,418 | 6/1987 | Dwyer . |
| 4,699,418 | 10/1987 | Plavetich . |
| 4,793,649 | 12/1988 | Yamano et al. . |
| 4,805,953 | 2/1989 | Yamauchi . |
| 4,837,914 | 6/1989 | Borum et al. . |
| 4,869,541 | 9/1989 | Wainwright . |
| 4,932,706 | 6/1990 | Wainwright et al. . |

(List continued on next page.)

FOREIGN PATENT DOCUMENTS

| | | |
|---|---|---|
| 0718 146 A1 | 6/1996 | European Pat. Off. . |
| 2698601 | 6/1994 | France . |
| 1049288 | 10/1983 | U.S.S.R. . |

OTHER PUBLICATIONS

Photographs of Jeep Cherokee with various views of the rear seats.

*Primary Examiner*—Joseph D. Pape
*Assistant Examiner*—Kiran Patel
*Attorney, Agent, or Firm*—Roland A. Fuller, III

[57] ABSTRACT

A passenger vehicle is provided with a tiered seating arrangement having first, second, and third seat assemblies. The second and third assemblies fold down to form a cargo carrying platform. The vehicle roof is raised above the second and third seat assemblies to provide appropriate headroom for the passengers.

26 Claims, 12 Drawing Sheets

U.S. PATENT DOCUMENTS

| | | |
|---|---|---|
| 4,932,709 | 6/1990 | Wainwright . |
| 4,957,321 | 9/1990 | Martin et al. . |
| 5,015,026 | 5/1991 | Mouri . |
| 5,029,936 | 7/1991 | Gonzalez . |
| 5,039,155 | 8/1991 | Suman et al. . |
| 5,044,683 | 9/1991 | Pärsson . |
| 5,104,177 | 4/1992 | Thomas, Jr. . |
| 5,150,946 | 9/1992 | Marfilius et al. . |
| 5,195,795 | 3/1993 | Cannera et al. . |
| 5,248,178 | 9/1993 | Brambilla . |
| 5,269,581 | 12/1993 | Odagaki et al. . |
| 5,273,336 | 12/1993 | Schubring et al. . |
| 5,280,987 | 1/1994 | Miller . |
| 5,322,344 | 6/1994 | Hoffman et al. . |
| 5,364,152 | 11/1994 | Mastrangelo et al. . |
| 5,368,355 | 11/1994 | Hayden et al. . |
| 5,383,699 | 1/1995 | Woziekonski et al. . |
| 5,466,048 | 11/1995 | Fowler et al. . |
| 5,482,349 | 1/1996 | Richter et al. . |
| 5,492,386 | 2/1996 | Callum . |
| 5,527,087 | 6/1996 | Takeda et al. . |
| 5,529,376 | 6/1996 | Jovan et al. . |
| 5,570,931 | 11/1996 | Kargilis et al. . |
| 5,577,805 | 11/1996 | Glinter et al. . |
| 5,582,453 | 12/1996 | Leuchtmann et al. . |
| 5,588,707 | 12/1996 | Bolsworth et al. . |
| 5,605,368 | 2/1997 | Noma et al. . |
| 5,626,391 | 5/1997 | Miller et al. . |
| 5,641,202 | 6/1997 | Rus . |
| 5,658,043 | 8/1997 | Davidson . |
| 5,658,046 | 8/1997 | Rus . |
| 5,788,324 | 8/1998 | Shea et al. . |
| 5,934,732 | 8/1999 | Jakubiec . |
| 5,947,554 | 9/1999 | Mashkevich . |

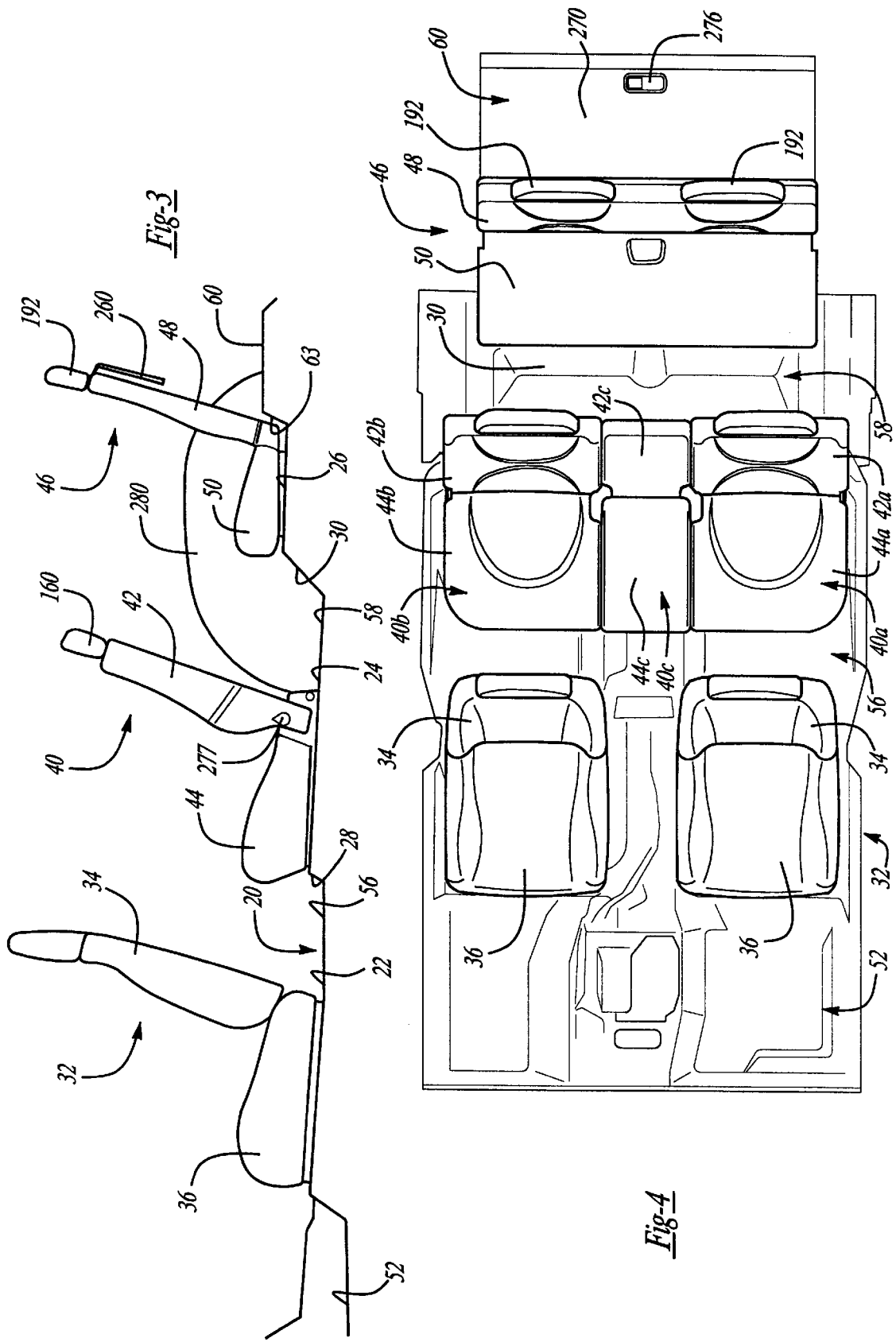

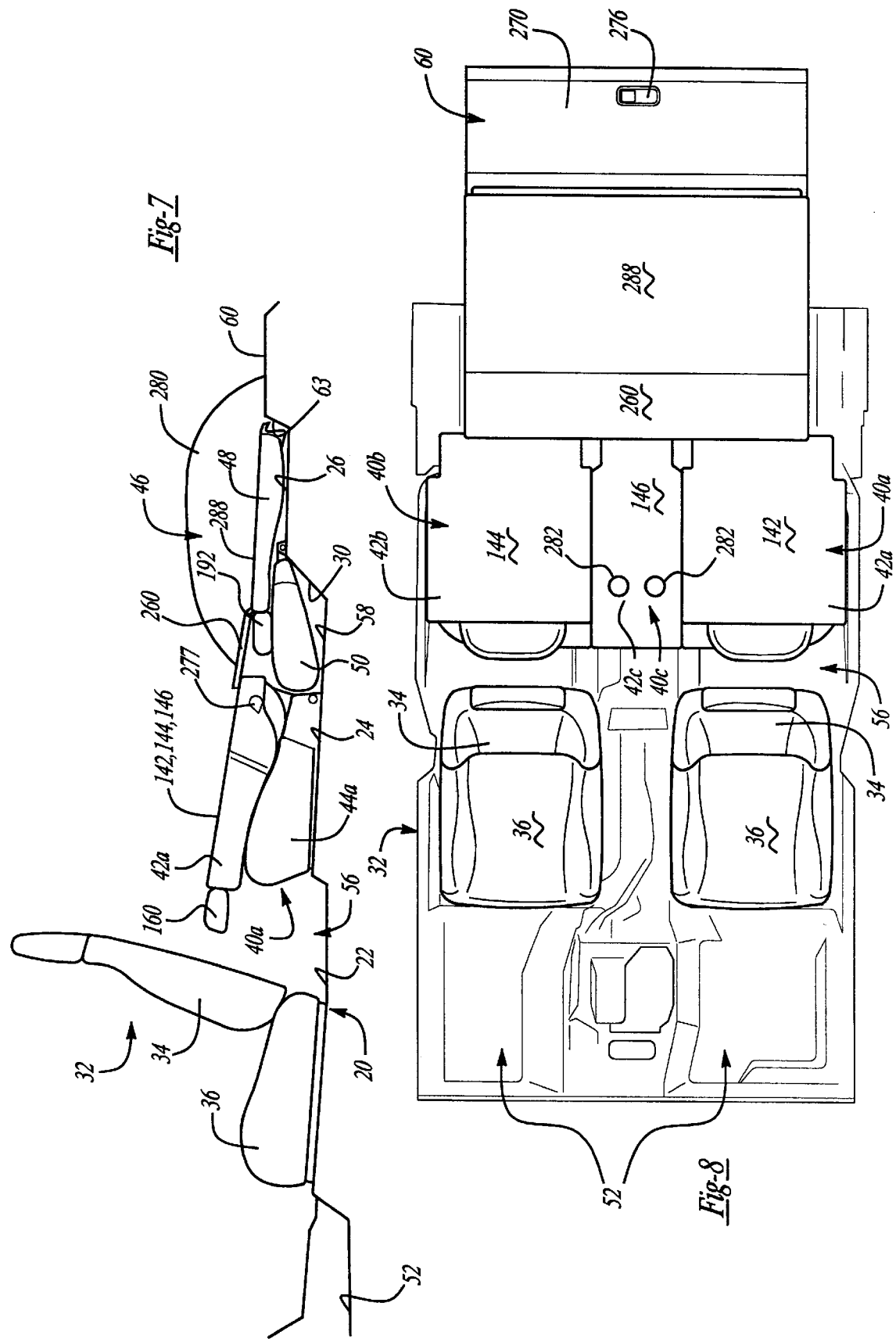

PASSENGER VEHICLE FLOOR AND SEAT ARRANGEMENT

FIELD OF THE INVENTION

The present invention relates to passenger vehicles and seating systems, and more particularly to a vehicle seating arrangement especially adapted for use in connection with enhanced capacity vehicles (ECVs), such as station wagons, sport utility vehicles and vans that have an enlarged cabin area for carrying either more cargo or more passengers (or both) than a conventional sedan.

BACKGROUND AND SUMMARY OF THE INVENTION

In recent years, ECVs have become increasingly popular. Examples of such products include the Station Wagon, the Sport Utility Vehicle, and the Mini-Van. These ECVs are all characterized by an enlarged cabin area that extends generally from the windshield of the vehicle, to the rear end of the vehicle where a tailgate (or rear hatch) is provided for rear access into the cabin.

The increased popularity of these vehicles can be attributed in some measure to their increased passenger carrying capacity when compared to conventional sedans. Most sedans include two rows of seats, including a front row in which the driver and front passenger(s) sit, and a first (and only) row of rear seats. Many ECVs include a second rear row of seats in addition to the front and back seats.

As both cargo and passenger carrying capacity are valued, it is desirable to design the first and second rear row of seats to be configured both to carry additional passengers and additional cargo, and to be convertible easily between an enhanced passenger carrying configuration, and an enhanced cargo carrying configuration.

Examples of patents showing various seating/cargo configurations for ECVs are Itoh U.S. Pat. No. 4,194,782; Odagaki et al U.S. Pat. No. 5,269,581; LeBault et al U.S. Pat. No. 4,277,736; Crawford et al U.S. Pat. No. 4,475,769; Gokimoto et al U.S. Pat. No. 4,484,776; Gokimoto et al U.S. Pat. No. 4,627,656; Plavetich U.S. Pat. No. 4,699,418; Brambilla U.S. Pat. No. 5,248,178; Hayden et al U.S. Pat. No. 5,368,355; Fowler et al U.S. Pat. No. 5,466,048; and Woziekonski et al U.S. Pat. No. 5,383,699.

Some of the patents described above disclose seats for use in vans and minivans, whereas others relate to seats for use in station wagons and sport utility vehicles. The design challenges faced by the designers of seats for vans are usually somewhat different than the challenges faced by those designing seats for station wagons and sport utility vehicles. Vans typically have a cargo compartment that is taller that the cargo compartments in either station wagons or sport utility vehicles. Additionally vans usually have a flat floor which extends generally between the back of the front row of seats and the tailgate. On the other hand, station wagons and sport utility vehicles typically do not have a flat floor.

Because of these different configurations, seats for vans are typically designed differently than seats for station wagons and sport utility vehicles. Most seats for vans are designed to be of chair height, and have relatively long legs which connect the lower surface of the seat bottom portion to the floor of the van. As the floor of the van is generally flat, and has no foot wells, most van seats do not contain mechanisms for making the seat a part of the van floor when the user desires to carry cargo. Rather, van seats are often designed to be removable to enable the user to remove the seat from the van when he wishes to have a large cargo area.

To the contrary, most middle and rear seat assemblies for sport utility vehicles and station wagons are not designed to be removable. Rather, the seats are designed to be foldable. To move the seat between its "passenger carrying" position and its "cargo carrying" position, the back portion and/or the seat bottom portion are rotated about pivot axes, so that one of the surface(s) of one or both of the back portions of the first and second rear seats are generally co-planar with the floor of the vehicle. When the first and second rear seats are placed in their "cargo" positions, a planar cargo surface can be formed which extends from the rearward facing surface of the front seats to the tailgate of the vehicle. An example of a folding arrangement that is useable in a station wagon is shown in LeBault et al U.S. Pat. No. 4,227,736.

Notwithstanding the existence of several known seating arrangements that provide for seats that are capable of being moved between a passenger carrying position and a cargo carrying position, room for improvement exists.

It is therefore one object of the present invention to provide a seat system that includes a pair of seats having a middle seat assembly that provides comfortable and safe seating for the occupants when the seat is in its seating position, and which can be folded into a cargo carrying position that provides a generally planar cargo carrying compartment.

Another difficulty that faces a seat designer of vehicles having three rows of seats is providing a means to permit ingress to and egress from the third seat. Most station wagons, vans and sport utility vehicles that have three rows of seats include either four or five doors. Almost all vehicles include left and right "front" doors to permit passengers to gain access to the left hand and right hand front seats. Many station wagons, sport utility vehicles, and minivans manufactured by the assignee, Chrysler Corporation, contain two rear side doors that are placed adjacent to the second row of seats. On such vehicles, the rearward opening tailgate is typically counted as the "fifth" door.

Because the rear side doors of most ECVs are positioned adjacent to the middle row of seats, means must be provided for enabling passengers to gain ingress and egress to the rear row of seats. Several currently known methods exist for providing such access. For example, many station wagons install a rearwardly facing rear seat that permits passengers to gain access thereto through the tailgate door. On minivans, a common practice is to use a middle seat that has a width substantially less than the width of the interior of the vehicle, to provide a space in the interior of the vehicle, adjacent to the door through which a passenger can pass to gain access to the rear seat.

Both of these two methods of providing ingress have drawbacks. For example, vehicle length constraints often make rear facing rear seats uncomfortable for passengers other than small children. Additionally, rearward facing rear seats are generally not suitable for use with car seats, thus precluding their use by very young children. Reduced width middle seats suffer the drawback of reducing the usable seat width, thus reducing the passenger carrying capacity of the vehicle.

It is therefore desirable to provide a full width middle seat for a vehicle that provides access to the rear row of seats to enable the rear row of seats to be placed in a forward facing orientation.

Another drawback of prior art seating arrangements is that passengers in the middle and rear seat assemblies have a view which is obstructed by the front seats or by the passengers in the front seats.

Accordingly, a passenger vehicle is provided with a tiered seating arrangement having first, second, and third seat assemblies. The vehicle is provided with a floor having a first platform upon which the first seat assembly is mounted, a second platform upon which said second seat assembly is mounted, and a third platform upon which the third seat assembly is mounted. The third platform is higher than the second platform and the third seat assembly is disposed behind the second seat assembly. The third platform is higher than the second platform by an amount that is substantially the same as a thickness of a seat bottom of the third seat assembly. A foot well portion is provided in the vehicle floor between the second vehicle seat assembly and the first seat assembly. The second platform is higher than the foot well portion by an amount that is substantially the same as a height of a headrest of said second seat assembly. The bottom section of the third seat assembly is capable of being articulated completely into a space between the second and third seat assemblies, such that a top surface of the bottom section is substantially at a same level as the third platform. The vehicle includes a covered compartment located behind the third seat assembly. The upper surface of the covered compartment is higher than the third platform. The vehicle includes a tiered headliner having a first tier extending over the first seat assembly and a second tier extending over the second and third seat assemblies, wherein the second tier is higher than the first tier. A roof height of the vehicle is higher above the second and third seat assemblies than above the first seat assembly.

According to still another aspect of the present invention, a passenger vehicle is provided including a passenger compartment having a floor including a first platform, a second platform, and a third platform. The third platform being higher than the second platform. A driver's seat is disposed in the passenger compartment on the first platform. A second seat assembly is disposed in the passenger compartment on the second platform and includes a seat bottom and a seat back movable between a first upright seating position and a second generally horizontal position. A third seat assembly is disposed in the passenger compartment and includes a seat bottom and a seat back movable between a first upright seating position and a second generally horizontal position. The second and third seat assemblies are configured and positioned so that when both of the seat backs are in the second position, the upper surfaces thereof lie generally in a common substantially horizontal plane. Each of the seat backs of the second and third seat assemblies has a generally flat upwardly facing load carrying surface when disposed in the second position.

Another challenge presented to designers of ECVs, is providing sufficient headroom for each of the vehicle passengers. According to another aspect of the present invention, an automotive vehicle is provided with a passenger compartment having a floor and a roof. First, second, and third seats are fixed to the floor in a fore-to-aft relationship. The third seat being higher than the second seat. The roof includes a forward portion and a higher rearward portion. The transverse line of the demarcation between the forward and rearward portions being disposed in approximate vertical alignment with a rearward edge of the first seat. The roof includes a gradually sloping intermediate roof portion disposed between and leading into the forward and rearward portions. A luggage rack is provided including two longitudinally extending side rails disposed along the side edges of the roof. The higher rearward portion of the roof being disposed between the side rails. The side rails extend longitudinally for approximately the full extent of the higher rearward roof portion.

According to still another aspect of the present invention, an automotive vehicle is provided with a passenger compartment having a floor and a roof. First, second, and third seats are affixed to the floor in a fore-to-aft relationship, the third seat being higher than the second seat. A mechanism is provided for moving the seat bottom of the third seat to the level of the second seat. The seat bottom of the third seat moves forwardly and downwardly to the level of the second seat.

The passenger vehicle floor and seat arrangement of the present invention provides seating for up to eight persons and offers numerous people/cargo combinations. The roof has been raised to provide more headroom and theater-styled raised seating for the middle and rear seat passengers. The middle and rear seats fold quickly and easily with one hand operation and lie nearly flat providing a large cargo area.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a side view of the seat arrangement according to the present invention with all of the seats in the passenger carrying position;

FIG. 4 is a top view of the seat arrangement of the present invention with all of the seats in the passenger carrying position;

FIG. 7 is a side view of the seat arrangement according to the present invention with the middle and rear seat assemblies in the cargo carrying position;

FIG. 8 is a top view of the seat arrangement according to the present invention with the middle and rear seat assemblies in the cargo carrying position;

DETAILED DESCRIPTION OF THE PREFERRED EMBODIMENTS

Figure 1:
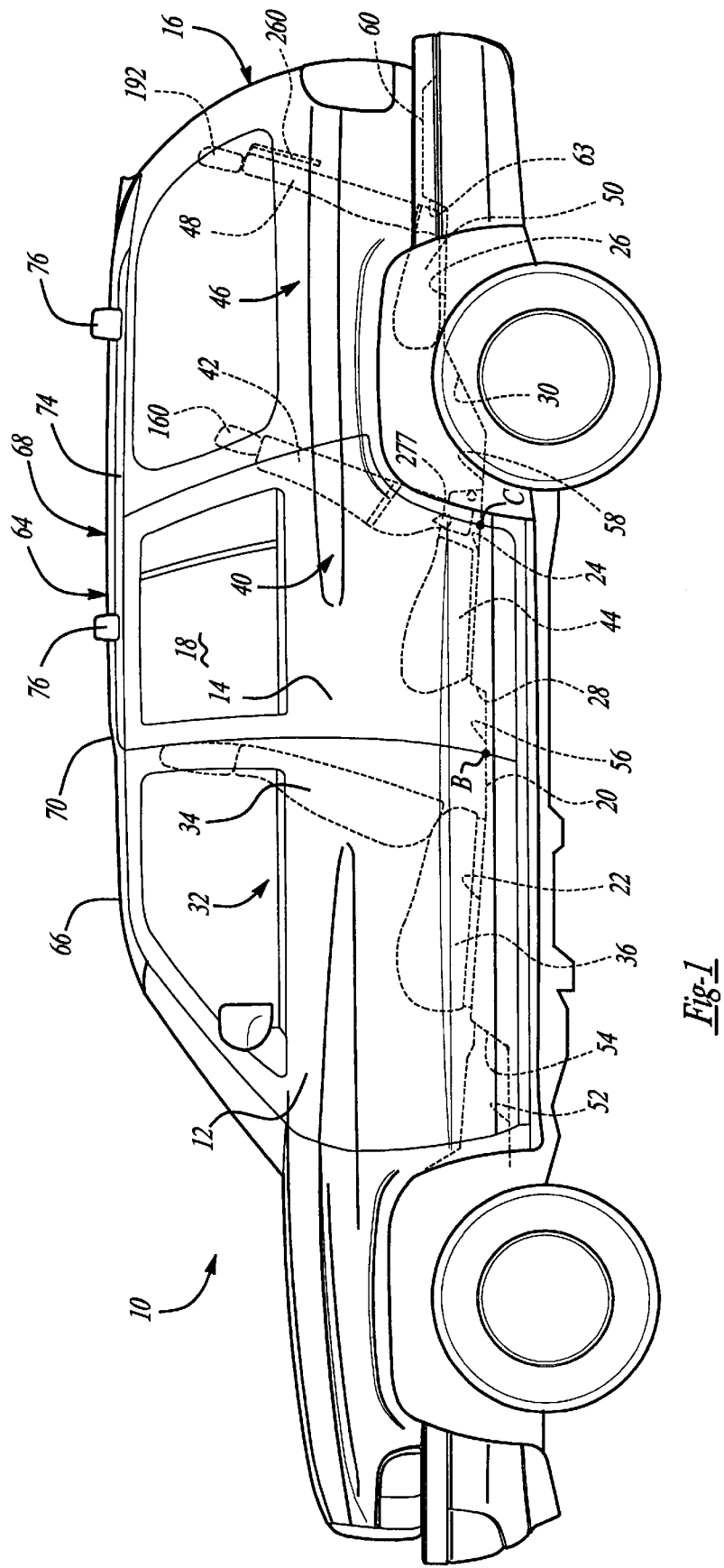
FIG. 1 is a side view of a passenger vehicle having a seating arrangement according to the present invention shown in phantom.
Figure 9:
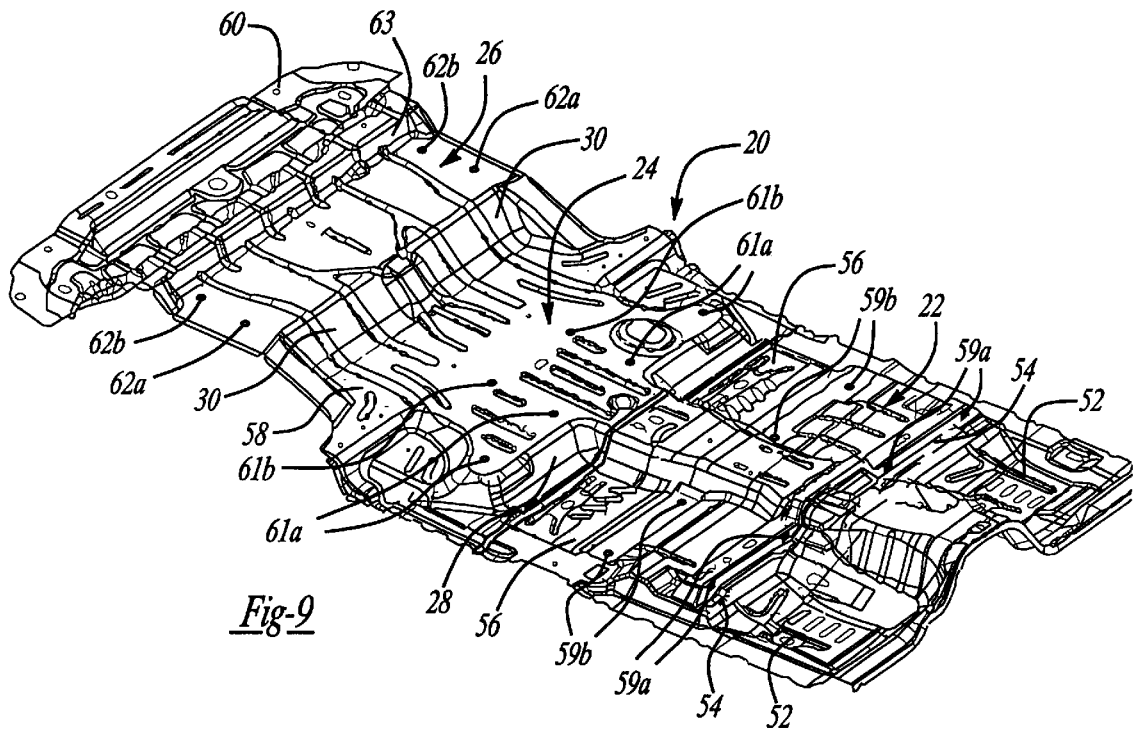
FIG. 9 is a perspective view of the floor pan for use with the vehicle seating arrangement according to the principles of the present invention.

With reference to FIG. 1, an enhanced capacity vehicle, particularly a sport-utility vehicle 10, is shown. The vehicle 10 includes a pair of front side doors 12, a pair of rear side doors 14, and a tailgate 16. The vehicle defines a passenger compartment 18 with a floor 20. As best seen in FIGS. 1 and 9, the floor pan 20 includes a first platform 22, a second platform 24, and a third platform 26. The second platform 24 is higher than the first platform 22 and a first rise portion section 28 is provided therebetween. The third platform 26 is higher than the second platform 24 and a second rise portion 30 is provided therebetween.

A front seat assembly 32 is disposed on the first platform 22. The front seat assembly 32 can comprise either standard bucket seats, a bench seat, or a split-bench seat. The front seat assembly 32 includes seat back portions 34 and seat bottom portions 36. A middle seat assembly 40 (including seat sections 40a–40c which will be described in greater detail later) is disposed on the second platform 24 and includes seat back portions 42a–42c and seat bottom portions 44a44c. A rear seat assembly 46 is mounted to the third platform 26. The rear seat assembly includes a seat back 48 and seat bottom 50.

The floor 20 includes a front foot well portion 52 disposed forward of the front seat assembly 32. A third rise portion 54 connects the front foot well portion 52 with the first platform 22. A middle foot well portion 56 is defined by the first platform 22 between the front seat assembly 32 and the first rise portion 28. A rear foot well portion 58 is defined between the second rise portion 30 and the middle seat assembly 40. A rear platform 60 is disposed behind the rear seat assembly 46. Rear platform 60 is higher than third platform 26 and extends from a rear of the rear seat assembly 46 to the tailgate 16. As seen in FIG. 9, floor 20 includes front seat forward attachment points 59a, front seat rearward attachment points 59b, middle seat forward attachment points 61a, middle seat rearward attachment points 61b, rear seat forward attachment points 62a, and rear seat rearward attachment points 62b. A fourth rise portion 63 connects the third platform 26 to the rear platform 60.

The vehicle roof 64 includes a forward portion 66 and a higher rearward portion 68. A gradually sloping intermediate roof portion 70 is disposed between the forward and rearward roof portions 66, 68. The transverse lines of demarcation between the forward portion and the higher rearward portion is disposed in approximate vertical alignment with the rearward edge of the first seat assembly 32. A luggage rack is disposed on the vehicle roof 64. The luggage rack includes a pair of longitudinally extending side rails 74 disposed along the side edges of the roof 64. The higher rearward portion 68 of the roof 64 is disposed between the side rails 74. The side rails 74 extend longitudinally for approximately the full extend of the higher rearward roof portion 68 and tend to optically camouflage the raised rearward roof portion 68. The roof rack includes a pair of longitudinally adjustable laterally extending rack members 76 which engage the side rails 74.

Figure 16A:
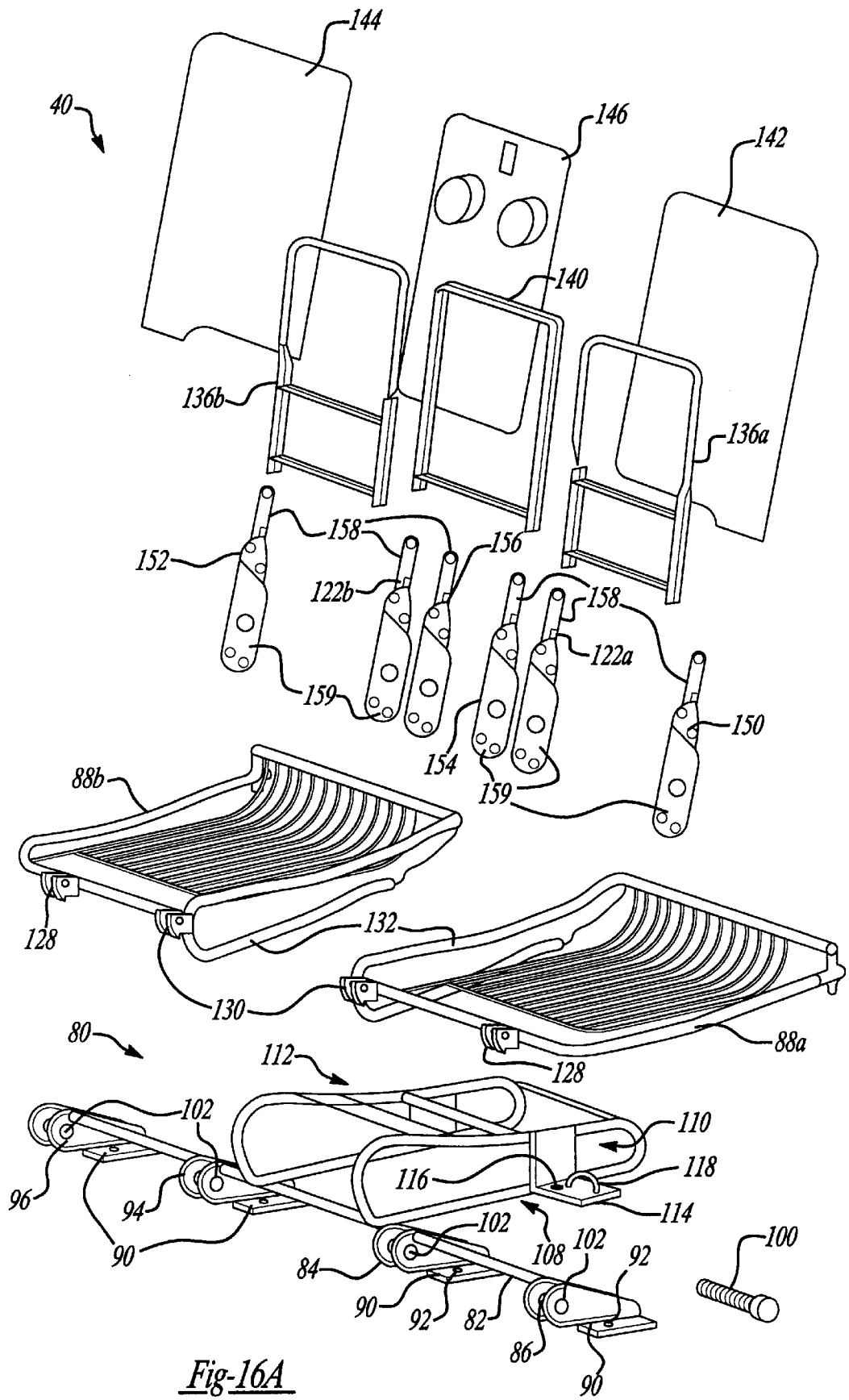
FIGS. 16A and 16B, when combined are an exploded view of the middle seat assembly of the present invention.
Figure 16B:
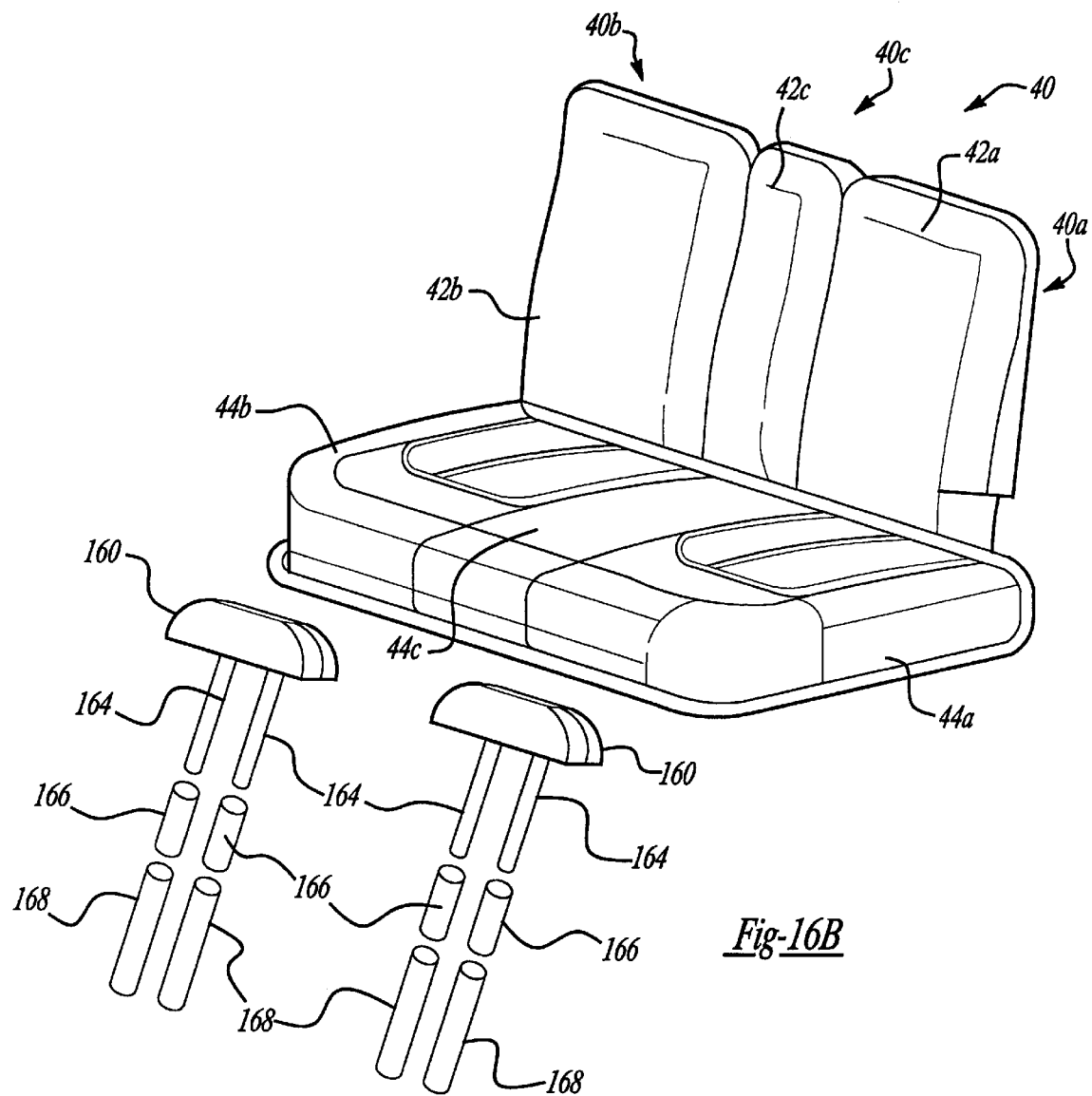

With reference to FIGS. 16A and 16B, the mechanical components of the middle seat assembly 40 will be described. Middle seat assembly 40 includes a coupler means 80 that couples the middle seat assembly 40 to the floor 20 of the vehicle 10. The coupler means 80 includes a laterally extending bar-like coupler frame 82 that extends generally across a full width of the middle seat assembly 40, and is coupled to each of first and second outer seat sections 40a, 40b, and third seat section 40c, as best seen in FIG. 16B. The coupler frame 82 includes a first seat section inboard bracket 84, and a first seat section outboard bracket 86. The inboard and outboard brackets 84, 86 are provided for coupling the coupler frame 82 to the seat frame 88a of the seat bottom portion 44a of first outer seat section 40a. The brackets 84, 86 each includes one or more flanges 90 that are disposed generally parallel to the floor 20, and are positioned adjacent to the floor 20. The flanges 90 include apertures 92 through which bolts (not shown) can pass for anchoring the brackets 84, 86 and, hence, the coupler frames 82 to the floor 20 of the vehicle 10. The coupler frame 82 also includes a second seat section inboard bracket 94, and a second seat section outboard bracket 96. The inboard and outboard brackets 94, 96 of the second outboard seat section 40b are generally similar to the inboard and outboard brackets 84, 86 of the first outboard seat section 40a. However, because of their position, the first outboard seat section 40a inboard and outboard brackets 84, 86 may be configured as mirror images of the second outboard seat section inboard and outboard brackets 94, 96. A seat frame 88b of the second outer seat section 40b is coupled to the coupler frame 82. Each of the inboard brackets 84, 94, and outboard brackets 86, 96 also includes pivot pins 100 (one of which is shown) which pass through apertures 102 in their respective pivot brackets 84, 86, 94, 96 that are attached to the coupler frame 82 and seat frames 88a, 88b. The pivot pins 100 are disposed generally parallel to the bar-like coupler frame 82, and form the pivot axis about which the seat frames 88a, 88b of the seat bottom portions 44a, 44b can pivot.

The coupler frame 82 also includes a third seat section seat frame 108 that comprises the skeleton of the seat bottom portion 44c of the center seat section 40c. The center seat section seat frame 108 also includes a shell over which the cloth cover of the seat bottom portion 44c is draped, along with support springs for supporting a passenger sitting on the seat bottom portion 44c. A first rear mounting bracket 110 and second rear mounting bracket 112 are mounted to the center seat section seat frame 108 for securing and supporting the respective inboard rear corners of the first and second seat frames 88a, 88b. The rear, inboard corner mounting brackets 110, 112 also may include horizontally extending flanges 114 containing apertures 116 through which bolts (not shown) can pass for anchoring the mounting brackets 110, 112, and hence the coupler frame 82 to the floor 20. The bolts (not shown) can also be used for mounting seatbelts adjacent to the center seat section 40c. Additionally, the inboard rear mounting brackets 110, 112 include a latch receiving means such as a latch striker 118 that is similar to the latch striker used on the front door latch mechanism of current Chrysler Corporation light truck vehicles for receiving a latch carried on the first and second seat bottom portion seat frames 88a, 88b for selectively releasably securing the seat frames 88a, 88b to the rear mounting brackets 110, 112.

The rear, inboard corner mounting brackets 110, 112, each include latch receiving means 118 for receiving a latch mechanism carried by the first and second seat sections 40a, 40b, respectively. The latch mechanisms are mounted to the seat frame by inboard mounted pivot support brackets 122a, 122b, respectively. The first seat section seat frame 88a includes a first seat section outboard pivot bracket 128 and a first seat section inboard pivot bracket 130. Similarly, the second seat section seat frame 88b includes an outboard pivot bracket 128 and an inboard pivot bracket 130. Each of the first and second seat frames 88a, 88b also include inboard disposed support members 132.

The seat components also include a first outer seat section back portion seat frame 136a, a second outer seat section back portion seat frame 136b, and a center seat section back portion seat frame 140. These back portion seat frames 136a, 136b, 140 provide structural rigidity and support for the seat back portions 42a, 42b, 42c and serve as skeletons over which the seat cloth and seat pads are draped. The relatively rigid facing surfaces 142, 144, 146 are attached to the respective first, second, and third back portion seat frames 136a, 136b, 140.

Back portion mounting brackets are fixedly coupled to the first, second, and third seat section back portion seat frames 136a, 136b, 140 for pivotably coupling the back portions 40a, 40b, 40c to the seat bottom portions 44a, 44b, 44c of the first, second, and third seat sections 40a–40c, respectively. The back portion mounting brackets include a first section outboard mounting bracket 150, first section inboard mounting bracket 122a, a second outboard section outboard mounting bracket 152, a second section inboard mounting bracket 122b, a center section left side mounting bracket 154, and a center section right side mounting bracket 156. Each of the mounting brackets includes an upper end 158 having one or more apertures for fixedly coupling the mounting brackets to the appropriate back portion seat frame 136a, 136b, 140. The mounting brackets also include lower ends 159 for pivotably coupling the back portion seat frames 136a, 136b, 140 (and hence, the respective back portions 42a, 42b, 42c) to the seat bottom portion seat frames 88a, 88b, 112, and hence the respective seat bottom portions 44a, 44b, 44c.

The latch mechanism used for the center seat section 40c is preferably an inertia type latch mechanism. It should be noted that although the back support section 42c of the center seat section 40c is latched to prevent movement, the seat bottom portion 44c is fixedly positioned and does not move, and hence, needs no latch mechanism. The seat back portions 42a, 42b of the outer seat sections 40a, 40b each include a headrest 160, as shown in FIG. 16B. Each of the headrests 160 include a pair of headrest rods 164 for engaging the headrests 160 to the back portion seat frames 136a, 136b, respectively. Two-piece guide members, which include an inner headrest guide member 166 and an outer headrest guide member 168 are provided for each of the four headrest rods 164. Suitable inner and outer headrest guide members are currently used on many vehicles manufactured by Chrysler Corporation. A detailed description of the operation of the middle seat assembly 40 will be provided hereinbelow.

Figure 10:
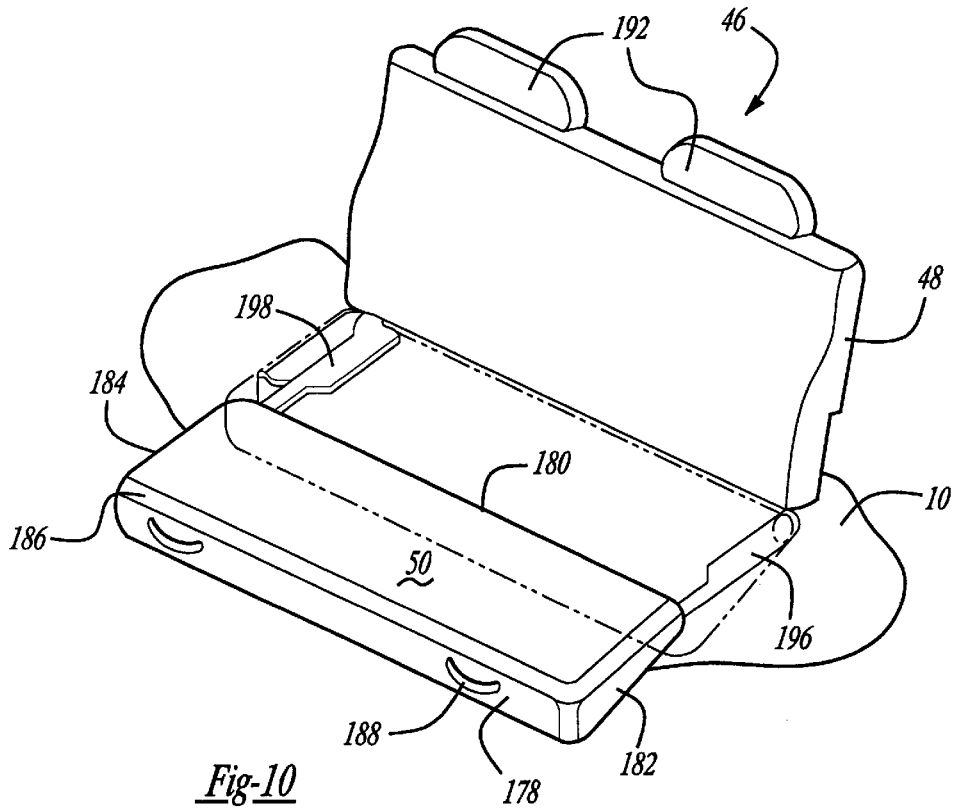
FIG. 10 is a perspective view of the rear seat assembly of the present invention with portions of the vehicle broken away for clarity, showing in solid lines the seat cushion moved translationally forward into its load floor position and showing in phantom the seat cushion in its seating position.

As shown in FIG. 10, the rear seat assembly 46 includes a seat bottom 50 defining a front edge 178, a rear edge 180, and two side edges 182, 184 extending therebetween. Also, the seat bottom 50 can include a vehicular seat pad 186, with one or more manually grippable handles 188 being attached to the pad 186 at the front edge 178 of the seat bottom 50.

As intended by the present invention, a person can pull one of the handles 188 to rotate the seat bottom 50 forwardly relative to the vehicle 10 to a cargo carrying position, shown in solid lines in FIG. 10. Also, a person can rotate the seat bottom 50 rearwardly from the cargo carrying position to a seating position, shown in phantom in FIG. 10.

FIG. 10 shows that the rear seat assembly 46 also includes a seat back 48 having passenger headrests 192. Additionally, the rear seat assembly 46 includes left and right mount assemblies 196, 198 that are fixedly attached, preferably by bolting, to the floor 20 of the vehicle 10. As more fully disclosed below, the seat back 48 is pivotably engaged with the mount assemblies 196, 198 for movement to the seating configuration shown in FIG. 10, wherein the seat back 48 is upright and the seat bottom 50 (when in the seating position) is orthogonally juxtaposed with the seat back 48. When both the seat bottom 50 and seat back 48 are in their respective seating positions, a seating configuration of the rear seat assembly 46 is established, and the seat bottom 50 locks the seat back 48 into the seating position.

As also discussed further below, the seat bottom 50 can be rotated forwardly to its cargo carrying position, thereby unlocking the seat back 48 and permitting the seat back 48 to be manually pushed downwardly to a cargo carrying position. In the cargo carrying position, the seat back 48 assumes a horizontal orientation and a cargo carrying configuration of the rear seat assembly 46 is established. Importantly, the above manipulations of the rear seat assembly 46 are accomplished without requiring the operation of release/lock knobs and operators, and require only the above-discussed manipulation of the handles 188 and seat back 48.

Figure 11:
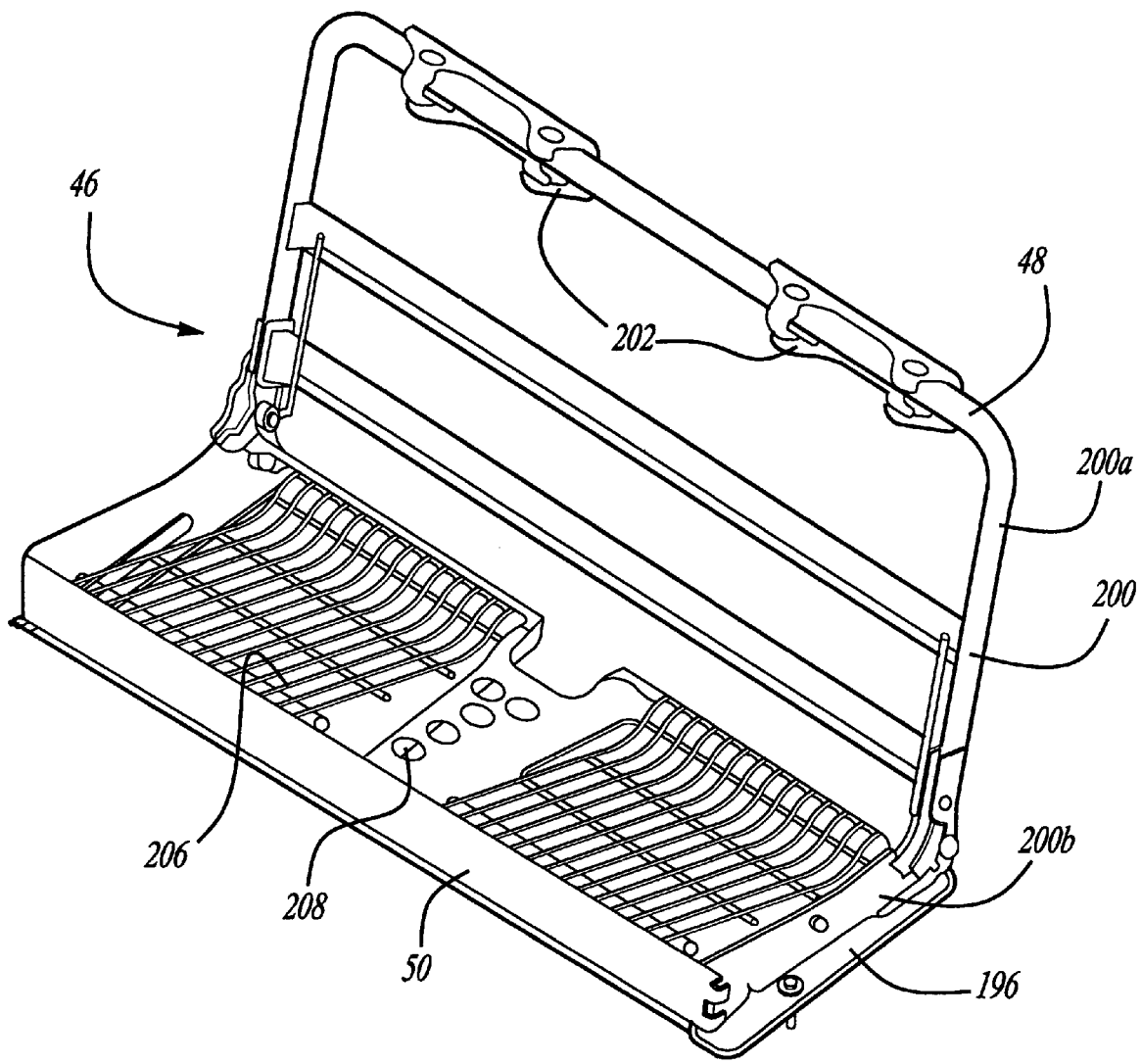
FIG. 11 is a perspective view of the rear seat assembly with the back support cushion and seat cushion removed.

FIG. 11 shows that the rear seat assembly 46 includes a seat frame 200 having a seat back frame 200A and a seat bottom frame 200B. As shown in FIG. 11, the seat back frame 200A include headrest supports 202, and the seat bottom frame 200B includes resilient seat cushion springs 206. If desired, cutout cavities 208 can be formed in the frame 200 to lighten the weight of the frame 200. It is to be understood that while FIGS. 10 and 11 show a bench seat configuration of the rear seat assembly 46, the principles of the present invention apply equally to a bucket seat configuration.

The details of the present invention can be appreciated in cross-reference to FIGS. 12–15. For clarity of disclosure, only the left mounting assembly 196 and cooperating rear seat assembly 46 structure will be discussed, but it is to be understood that the right mounting assembly 198 with corresponding structure are substantially identical in configuration and operation.

Figure 12:
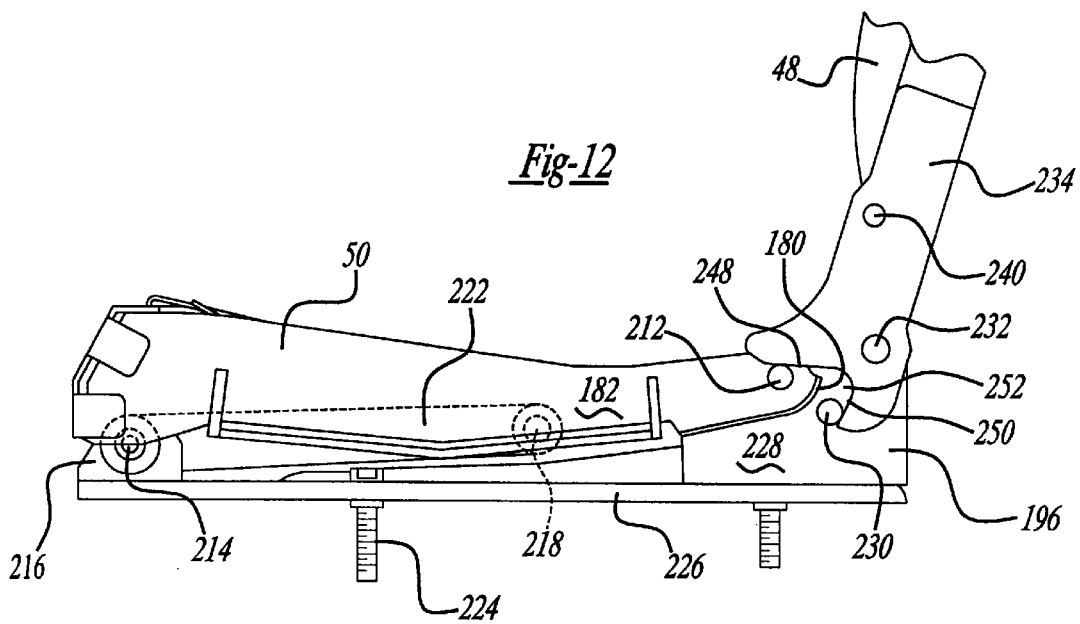
FIG. 12 is a side elevational view of the rear seat assembly in the seating configuration, with portions broken away.
Figure 15:
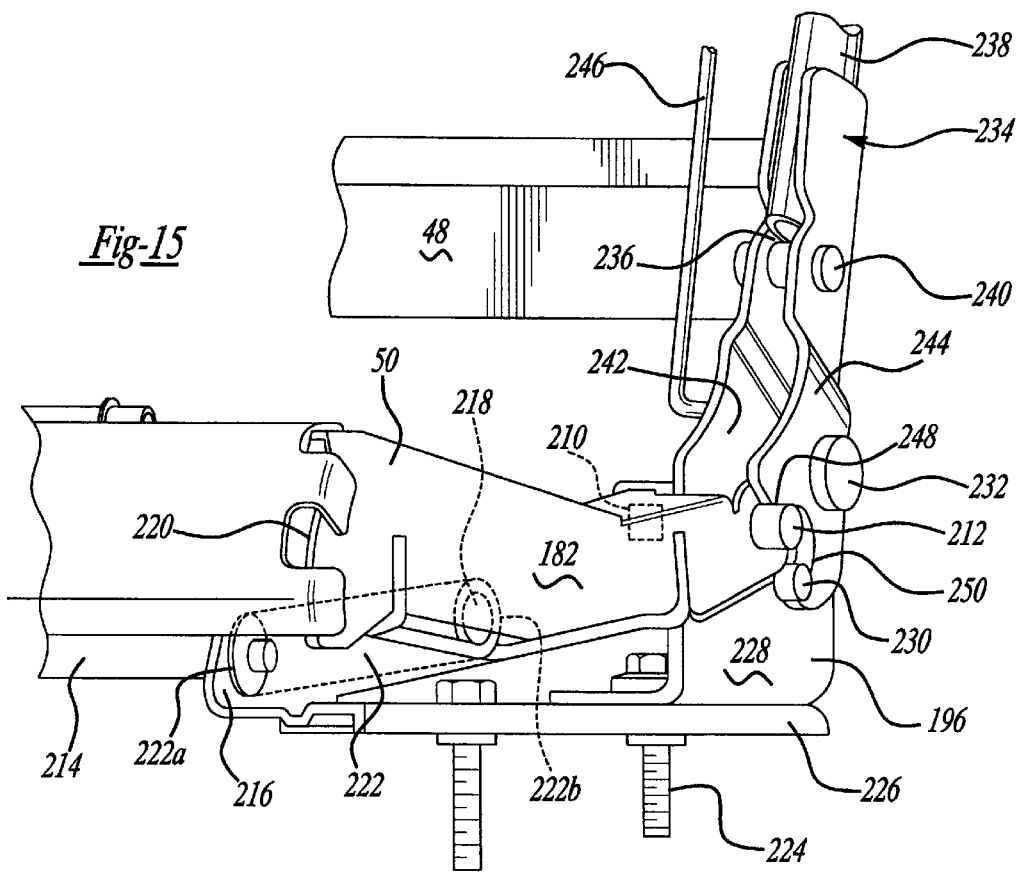
FIG. 15 is a perspective view of the engagement mechanism of the rear seat assembly invention with portions of the rear seat assembly broken away.

As shown in cross-reference to FIGS. 12 and 15, at least one and preferably inner and outer rigid metal interlock pins 210, 212 are immovably attached to the left side edge 182 of the seat bottom 50 near the rear edge 180. The interlock pins 210, 212 can advantageously be welded to the seat bottom 50. In any case, as intended by the present invention, the pins 210, 212 are immovable in that neither can be moved easily by hand, in contrast to release and locking devices which require user manipulation. Each interlock pin 210, 212 extends laterally away from the left side edge 182; the inner pin 210 extending laterally inwardly relative to the rear seat assembly 46 and the outer pin 212 extending laterally outwardly.

An elongated cylindrical solid or hollow metal torque tube 214 extends from the left side edge 182 of the seat bottom 50 to the right side edge 184 near the front edge 178 of the seat bottom 50. The torque tube 214 is attached to left and right vertical front bar brackets (only the left bar bracket 216 shown) of the left mounting assembly 196. Also, a cylindrical left pivot pin 218 is attached to the left side edge 182 of the seat bottom 50 on an inner surface 220 thereof.

As shown in FIGS. 12 and 15, a rigid elongated metal left pivot arm 222 couples the seat bottom 50 to the mount assembly 196. More specifically, the pivot arm 222 is rotatably engaged with both the torque tube 214 and the pivot pin 218 near the ends 222a, 222b of the pivot arm 222. With this combination of structure, the seat bottom 50 can be rotated forwardly and upwardly from the seating position shown in FIG. 12 toward an intermediate position shown in FIG. 13. Continued rotation of the seat bottom 50 moves the seat bottom 50 to the cargo carrying position shown in FIG. 14, in which the pivot arm 222 has rotated about 180 degrees from the seating position and in which the seat bottom 50 is displaced forwardly from the seating position.

Continuing with the description of FIGS. 12 and 15, and in particular with the description of the left mounting assembly 196, a plurality of bolts 224 hold a bottom flange 226 of the left mounting assembly 196 against the floor 20 of the vehicle 10. Further, a rear vertical flange 228 is welded to the bottom flange 226 as shown, and inner and outer opposed rigid metal stop pins (only the outer stop pin 230 shown) are formed on or welded to the rear flange 228 and a lower left connector bracket 234 of the seat back 48. In accordance with the present invention, the back pivot pin 232 is rotatably engaged with the connector bracket 234 to thereby pivotably engage the seat back 48 with the mounting assembly 196.

With particular attention now to the seat back 48, the connector bracket 234 is formed with a channel 236 configured for engaging a cylindrical frame bar 238 of the seat back 48. If desired, a support pin 240 can extend through the connector bracket 234 across the channel 236, just below the frame bar 238.

As shown best in FIG. 15, the connector bracket 234 is established by inner and outer fingers 242, 244 which are mirror images of each other. A trim wire 246 is coupled to the seat back 48 as shown in accordance with well-known principles to support seat fabric.

Importantly to the present invention, the outer finger 244 is formed with an engagement surface 248 and a stop surface 250. It is to be understood that the inner finger 242 is likewise formed with a respective engagement surface and a stop surface (not shown), with the respective inner engagement surface being parallel to and inboard from the outer engagement surface. The use of two engagement surfaces and interlock pins per side more firmly holds the rear seat assembly 46 in the seating configuration without rocking motion between the seat bottom 50 and seat back 48, vis-a-vis a single pin/engagement surface per side. Also, the use of doubled components increases the structural rigidity of the rear seat assembly 46.

As shown best in FIG. 12, when the seat back 48 is in the seating position, the engagement surface 248 is oriented generally horizontally, while the stop surface 250 is oriented generally vertically. And, a bight 252 is established by the surfaces 248, 250.

With the above disclosure in mind, the inventive cooperation of structure embodied in the rear seat assembly 46 can now be appreciated. In the seating configuration of the rear seat assembly 46, the pins 212, 230 are received in the bight 252. Indeed, in the seating configuration, the interlock pin 212 abuts the engagement surface 248 of the seat back 48 to hold the seat back 48 in an upright seating position. On the other hand, in the seating configuration, the stop pin 230 abuts the stop surface 250 to prevent the seat back 48 from being pushed away from the load floor position beyond the seating position shown.

Figure 13:
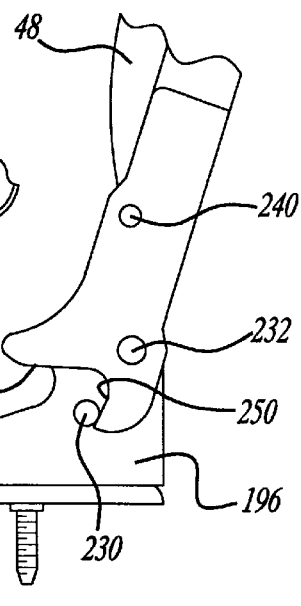
FIG. 13 is a side elevational view of the rear seat assembly intermediate the seating configuration and load floor configuration, with portions broken away.

When the seat bottom 50 is rotated forwardly to the position shown in FIG. 13, the interlock pin 212 is distanced from the engagement surface 248. Thus, the seat back 48 is no longer constrained by the interlock pin 212.

Figure 14:
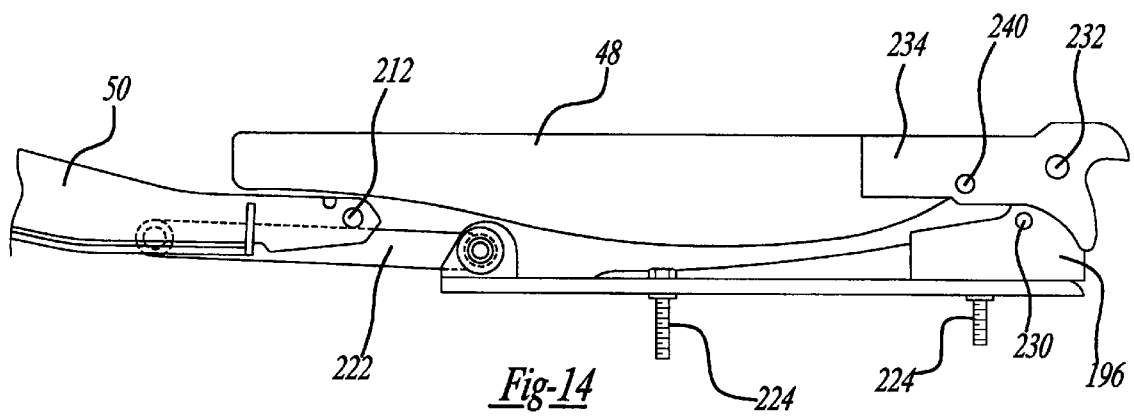
FIG. 14 is a side elevational view of the rear seat assembly in the load floor configuration, with portions broken away.

The seat bottom 50 is rotated further to the load floor position shown in FIG. 14. Then, the seat back 48 can be pushed downwardly to a horizontal orientation as shown, to establish the cargo carrying configuration of the rear seat assembly 46. As best shown in FIG. 7, the seat back 48 extends over the platform 26 and over top of the seat bottom 50 which rests in the foot well portion forward of the platform 26. The seat back 48 has a height which is between approximately 50 and 100 percent greater than a width of the seat bottom 50.

Accordingly, the rear seat assembly 46 can be moved to the seating configuration shown in FIG. 12. In the seating configuration, the seat bottom 50 is orthogonally juxtaposed with the seat back 48, and the seat bottom 50 locks the seat back 48 in an upright seating position. Further, the seat bottom 50 includes two front edge handles 188 that are manipulable by a person to rotate the seat bottom 50 forwardly away from the seat back 48 to a cargo carrying position and thereby unlock the seat back 48. Consequently, the seat back 48 can be pushed by a person into a horizontal cargo carrying position to establish a cargo carrying configuration of the rear seat assembly 46.

The seat back 48 of rear seat assembly 46 includes a flap 260 hingedly attached along the upper edge of the seat back 48. The flap 260 is provided with a pair of snaps 262 which are engaged by a pair of straps 264 which are attached to the seat back 48. The straps 264 keep the flap 260 from moving freely when the vehicle is started and stopped. The flap 260 is provided for filling a gap between the seat back 48 of rear seat assembly 46 and the middle seat assembly 40 when the rear seat assembly 46 is in the cargo carrying configuration. Straps 264 are disengaged from snaps 262 so that the flap 260 can be pivoted forward and supported by headrests 192. The headrests 192 for the back section 48 of the rear seat assembly 46 is recessed sufficiently from a back surface of said back section 48 to enable the flap 260 to lay essentially flat over the headrests 192 in a flipped over position. As best shown in FIG. 7, the seat back 48 and flaps 260 combine to extend a distance approximately equal to two times the width of the seat bottom 50.

Figure 17:
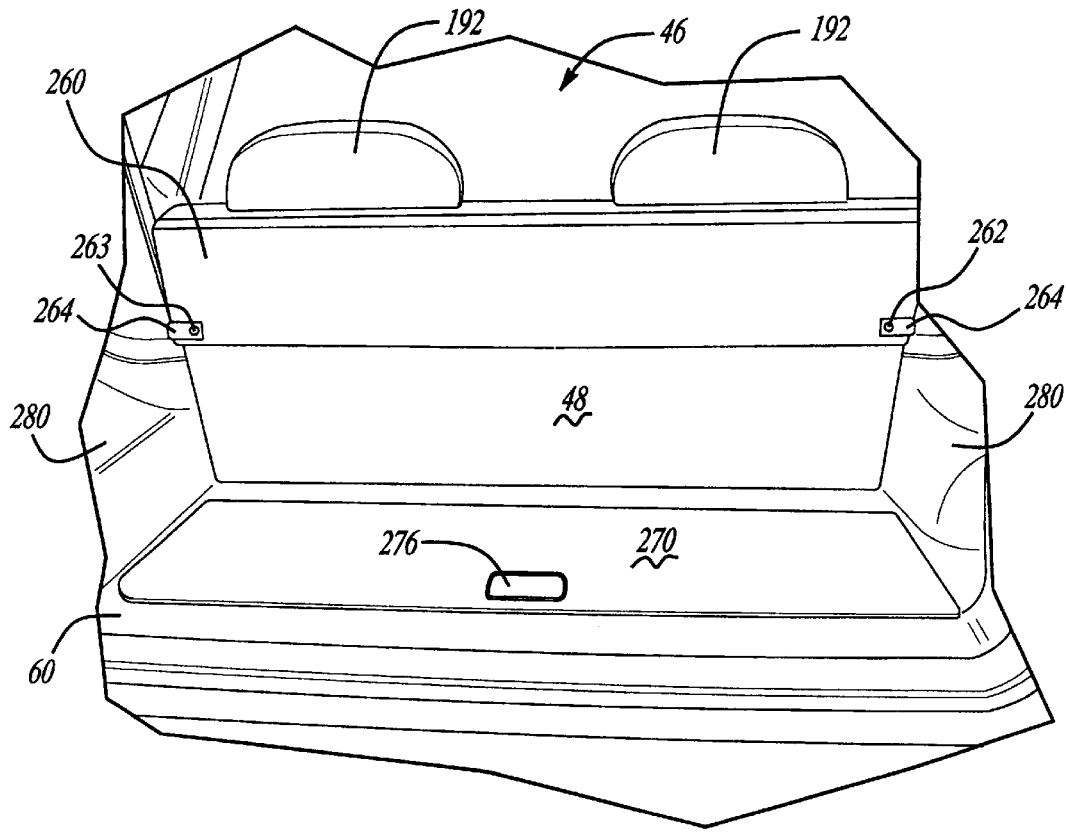
FIG. 17 is a rear view of the rear platform and the rear seat assembly according to the principles of the present invention.
Figure 18:
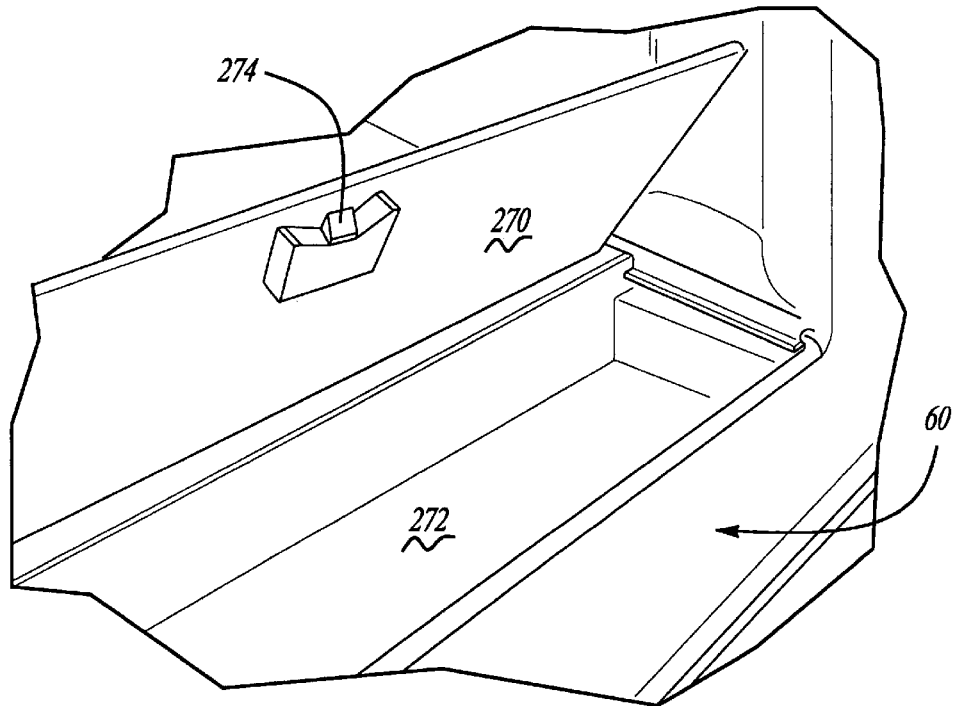
FIG. 18 is a perspective view of the storage compartment disposed in the rear platform according to the principles of the present invention.

As shown in FIGS. 17 and 18, the rear platform 60 of the floor 20 includes a storage compartment cover 270 which covers a recessed storage compartment 272. The cover 270 includes a latch 274 and a latch handle 276 for operatively disengaging latch 274. The recessed storage compartment 272 has a depth substantially the same as the height of the rear platform 60 and is provided for storing loose objects therein as well as maintaining valuables out of sight.

With reference to FIGS. 2–8, the operation of the seat arrangement of the present invention will now be described. Turning first to FIGS. 3 and 4, the middle and rear seat assemblies 40, 46 are shown in their passenger carrying configuration. In this position, the seat bottom portions 44a–44c of the middle seat assembly are disposed generally perpendicular to the respective back portions 42a–42c. The seat bottom portions 44a–44c are resting on the second platform 24 of the vehicle floor 20. For maintaining the seat securely onto the floor 20, the latch mechanisms fixedly couple the seat bottom portions 44a and 44b to the latch receiving means 118, and latch mechanisms fixedly couple the seat back portions 42a, 42b perpendicular relative to the seat bottom portions 44a, 44b.

As the frame coupler member 82 is disposed generally adjacent to the front surfaces of the seat bottom portions 44a–44c, most of the middle seat assembly is disposed generally above and behind the laterally extending frame coupler member 82. Because the door opening is positioned generally between points B and C (FIG. 2), passengers can gain easy access to the middle seat assembly 40, as the door opening is generally adjacent to the second platform 24. However, as the C pillar is positioned generally at point C, ingress and egress from the rear seat assembly 46 cannot be accomplished without some difficulty, such as by climbing over the middle seat assembly 40, or by entering the vehicle through the tailgate and then climbing over the rear seat assembly 46.

To enable a passenger to gain ingress to the rear seat assembly 46, the latch means can be actuated for either of the first outer seat section 40a or the second outer seat section 40b (or both) to move the seat sections 40a, 40b into their passenger access configuration. To do this, for the second outer seat section 40b, the outer seat section 40b is moved from its first or passenger carrying position as shown in FIG. 4 into its second or cargo carrying position as shown in FIGS. 7 and 8. In order to move the second seat section 40b into the second position, the unitary latch actuator 277 is actuated to release the latch connection between the back portion 42b and the seat bottom portion 44b of the second seat section 40b, to permit the back portion 42b to fold forwardly to a position wherein the seat bottom portion 44b and back portion 42b are disposed generally parallel to each other, and also generally parallel to the second platform section 24 of the floor 20.

Figures 5, 6:
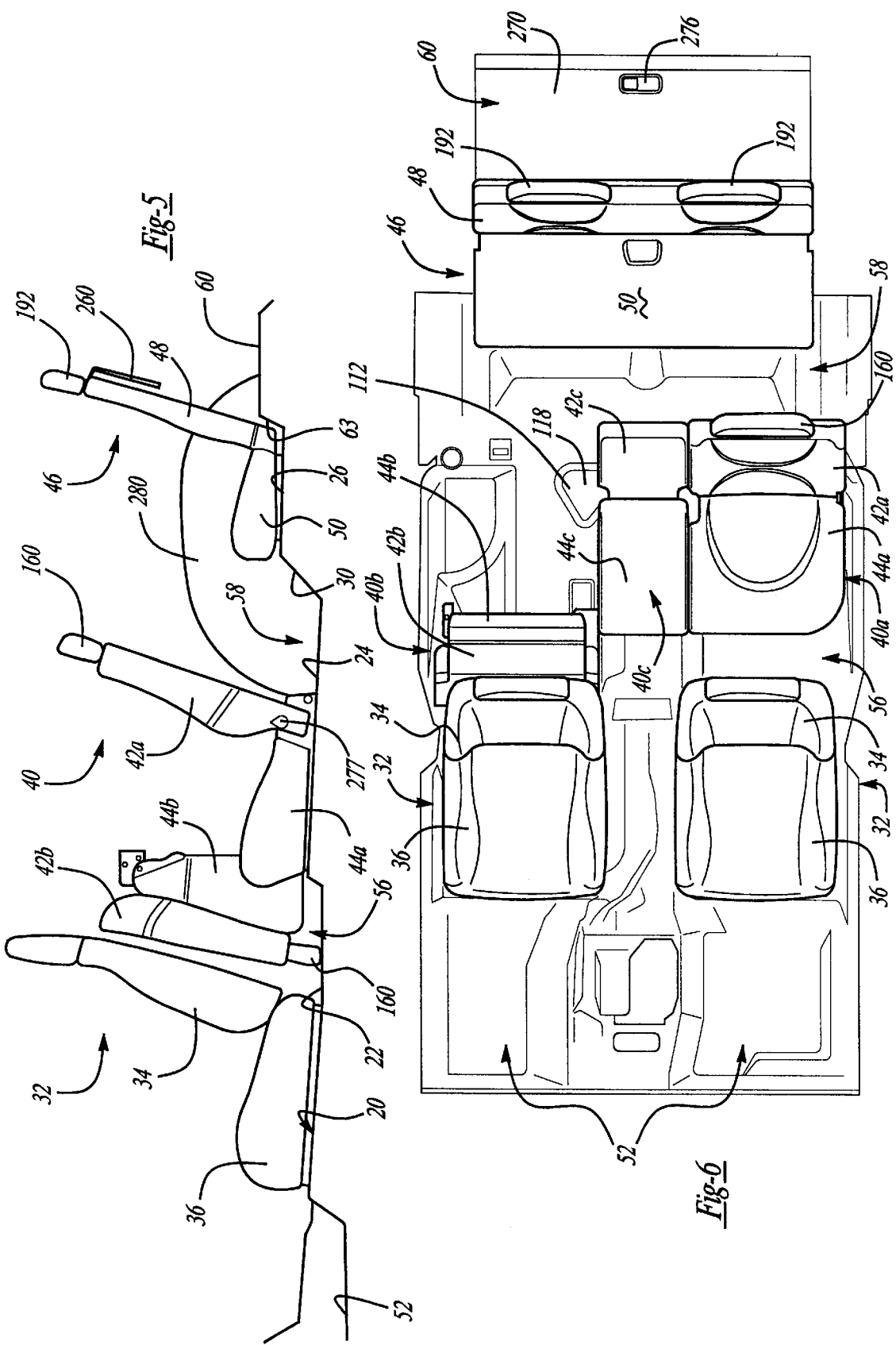
FIG. 5 is a side view of the seat arrangement of the present invention with an outer seat section of the middle seat assembly folded forward to allow ingress and egress to the rear seat assembly.
FIG. 6 is a top view of the seat assembly according to the present invention with an outer seat section of the middle seat assembly being folded forward to allow ingress and egress to the rear seat assembly.

The unitary latch actuator 277 is then moved into its seat bottom portion disengaged position, wherein the latch mechanism becomes disengaged from striker 118 that is mounted on the center section inward mounting bracket 112 (FIG. 16A) to permit the seat bottom portion 44b to pivot about an axis formed by the pivot members 100. This allows both the seat bottom portion 44b and the back portion 42b to move into the third position, as shown in FIGS. 5 and 6. In the third position, the seat bottom portion 44b and the back portion 42b are disposed generally parallel to each other, and also generally perpendicular to the horizontally disposed second floor platform section 24. When so placed in the third position, both the seat bottom portion 44b and back portion 42b are disposed generally forwardly of the laterally extending bar-like coupler frame 82 and are positioned over the first rise portion 28 and the middle footwell portion 56 of the floor 20. As the first platform section 22 (as well as the middle footwell portion 56) is at a lower level than the second platform section 24, the overhang of the headrest 160 can be accommodated to allow the seat bottom portion 44b and back portion 42b to be placed generally at a 90 degree angle to the horizontal floor sections 22, 24, with the upper surface of the headrest 160 still being placed above the floor 20.

Figure 2:
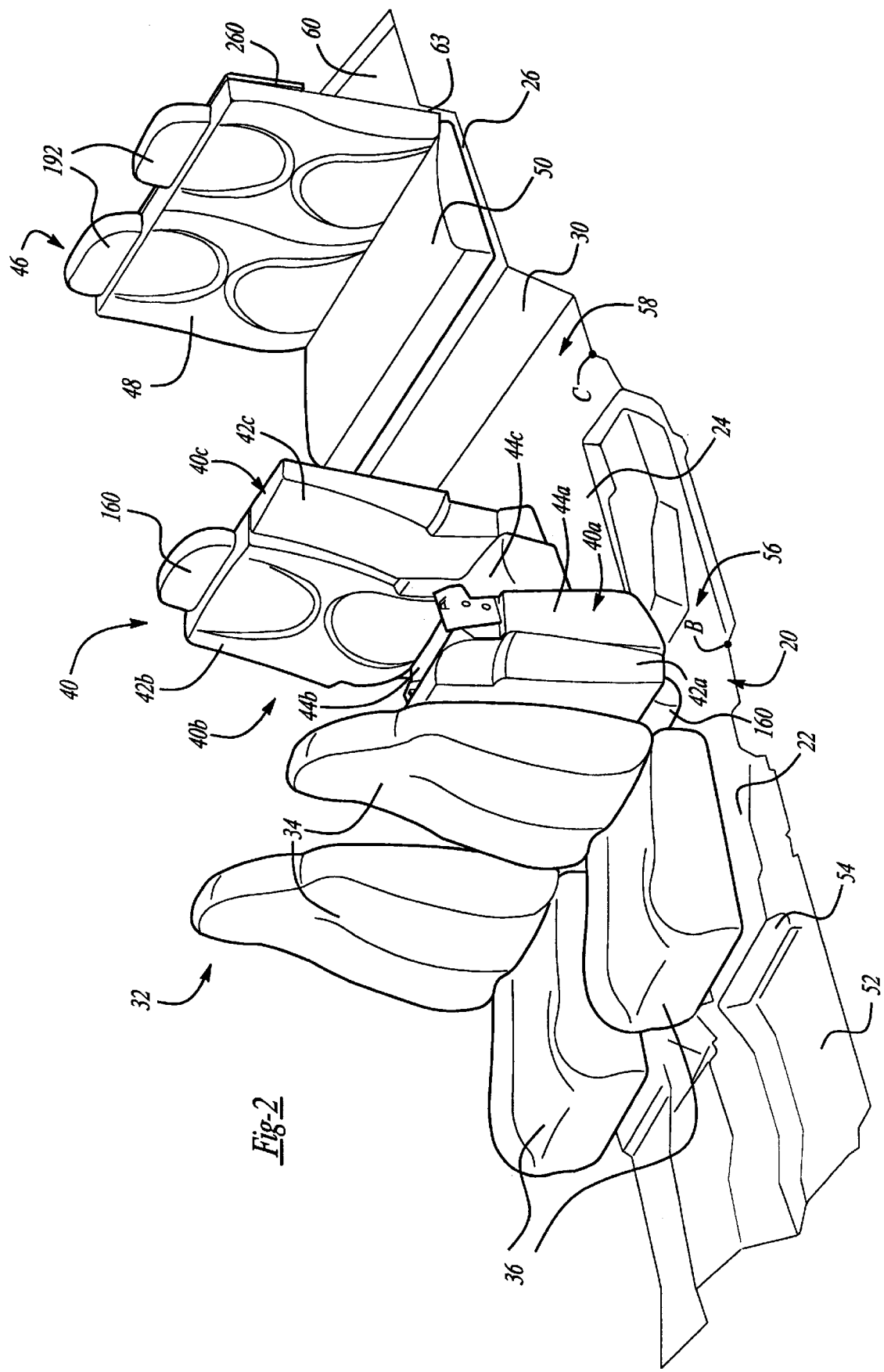
FIG. 2 is a perspective view of the vehicle seating arrangement according to the present invention with an outer seat section of the middle seat assembly in a forward position to allow ingress and egress to the rear seat assembly.

It should be noted that the above provides a description of moving the second outer seat section 40b of the middle seat assembly 40 to the passenger access configuration. The first outboard seat section 40a of middle seat assembly is movable in the same manner to a passenger access configuration, as shown in FIG. 2. First outer seat section 40a can also be placed in a first position, as shown in FIG. 4, wherein the seat bottom portion 44a and seat back portion 42a are disposed generally perpendicularly, with the seat bottom portion 44a being disposed generally parallel to the second platform section 24, and the back portion 42a being disposed generally perpendicular to the second platform section 24. The first outboard seat section 40a of the middle seat assembly 40 can then move in the second (cargo carrying) position as in FIGS. 7 and 8, where the seat bottom portion 44a and back portion 42a are generally parallel to each other, and also parallel to the platform section 24. By movement of the latch means, the first outer seat section 40a can be rotated to its third (passenger access) position, as shown in FIG. 2. Because each of the first and second outer seat sections 40a, 40b of the middle seat assembly 40 are movable into their third positions (passenger access configurations), ingress and egress to and from the rear seat assembly 46 can be gained from either the left side or right side rear doors.

The center seat section 40c is movable between a first position as shown in FIG. 4 where the seat bottom portion 44c is disposed generally perpendicular to the back portion 42c, and a second position as shown in FIG. 8, where the seat back portion 42c is disposed generally parallel to the seat bottom portion 44c. In the first position, the seat back portion 42c is disposed generally perpendicular to the second platform section 24 of the floor 20, and the seat bottom portion 44c is disposed generally parallel to the second platform section 24. In the second (cargo carrying) position, both the seat bottom portion 44c and the seat back portion 42c are disposed generally parallel to the second platform section 24. The seat bottom portion 44c of the center seat section, unlike the seat bottom portions 44a, 44b of the first and second outer seat sections 40a, 40b, is not movable into a third position. Such movement is not necessary because the first and second outer seat sections 40a, 40b provide adequate space for ingress or egress to and from the rear seat assembly 46.

In FIGS. 7 and 8, each of the middle and rear seat assemblies 40, 46 are shown in their second or cargo carrying position. When each of the seat sections 40a–40c of the middle seat assembly 40 are placed in their cargo carrying position, the rearward surfaces 142, 144, 146 of the back portions 42a–42c of the respective seat sections 40a–40c are disposed generally co-planarly to foster the carrying of cargo thereon. The cargo carrying surface is formed which extends generally from the headrest 160 of the first and second outer seat sections 40a, 40b of the middle seat assembly 40, to the tailgate (rear hatch) 16 of the vehicle 10. This generally planar cargo surface permits the vehicle 10 to carry a large amount of cargo. Preferably, the cargo carrying platform is at least as wide as the space between the wheel wells 280 which are disposed generally on opposite sides of rear seat assembly 46.

Turning now to FIGS. 3 and 4, the rear seat assembly 46 is movable between a first or passenger carrying position wherein the seat back portion 48 is disposed generally perpendicular to the seat bottom portion 50; and to a cargo carrying position as shown in FIGS. 7 and 8 wherein the seat back portion 48 is disposed generally parallel, and almost co-planar with the rear platform section 60 of the floor 20. When in the passenger carrying position, the back portion 48 is disposed generally perpendicular to the third platform section 26 and rear platform 60.

Because of the ability of the middle and rear seat assemblies 40, 46 to be moved independently of one another, and of the first and second outer seat sections 40*a*, 40*b* and the center seat section 40*c* of the middle seat assembly 40, to be moved independently, a wide variety of seating and cargo carrying configurations are possible. As shown in FIGS. 3 and 4, each of the middle and rear seat assemblies 40, 46 can be placed in their first or passenger carrying positions to maximize the passenger carrying capacity of the vehicle. As both the middle and rear seat assemblies 40, 46 are full width seats, the middle seat assembly 40 is capable of carrying three passengers and the rear seat assembly 46 is capable of carrying at least two passengers. If coupled with a bench-type front seat, the vehicle would then be capable of carrying eight passengers (three in the front, three in the middle, and two in the back). For times when less passenger carrying capacity is needed, the rear seat assembly 46, alone, can be folded into its cargo carrying position. This provides a cargo area extending between the back surfaces 142, 144, 146 of the middle seat assembly 40 and the rear hatch of the vehicle 10. In such a configuration, the vehicle 10 maintains a substantial cargo carrying capacity while still permitting five or six passengers to be carried, depending upon whether the front seat assembly 32 includes bucket or bench-style seats.

Another variation on the seating arrangement is provided with one or two of the seat sections 40*a*–40*c* of the middle seat assembly 40 being moved to a cargo carrying position. In this position, the other of the seat sections 40*a*–40*c* of the middle seat assembly can be used for passenger seating with some of the seat sections being in the cargo carrying position so that numerous configurations are available. Further, the seat back 42*c* of the center seat section 40*c* of the middle seat assembly 40 has the potential to serve as an arm rest for a passenger sitting in the first or second outer seat sections 40*a*, 40*b* of the middle seat assembly 40. Further, the center seat section 40*c* can serve as a "pass through" for accommodating long length cargo such as boards, skis, ladders, etc. Additionally, the center seat section 40*c* provides a passenger in the first or second outer seat sections 40*a*, 40*b* with a section to place a drink in the cupholder 282, as shown in FIG. 8 and FIG. 16A. Alternatively, the rearwardly facing surface 146 of the center seat section 40C can serve as a work surface. Because rearward facing surface 146 is elevated slightly, the upper surface 146 can serve as a stand for a computer, or as a writing surface. No doubt, other configurations of the seat arrangement of the present invention are also possible to serve a variety of specialized purposes or desired ends.

As is shown in FIGS. 7 and 8, a gap that is provided between the seat backs 42*a*–42*c* of the middle seat assembly 40 and seat back 48 of rear seat assembly 46 can be filled by folding flap 260 over top of headrests 192. Flap 260 preferably rests on a rear surface of headrests 192 and is co-planar with the rear surfaces 142, 144, 146 of middle seat assembly 40 when in the cargo carrying position.

As shown in FIG. 7, the rear foot well portion 58 which is lower than the third platform 26, provides a space for receiving the seat bottom 50 of rear seat assembly 46. The spacing of the rear foot well 58 is preferably such that the seat bottom 50 in its cargo carrying position, supports the seat back 48 in its cargo carrying position such that the rear surface 288 of the seat back 48 is generally coplanar with the rear platform 60 and the rear surfaces 142, 144, 146 of seat back portions 42*a*–42*c* in their cargo carrying positions.

As best seen in FIGS. 2 and 5, the middle foot well portion 56 is lower than the second platform 24. In addition to providing additional legroom for passengers in the middle seat assembly 40, the middle foot well portion 56 accommodates the headrests 160 of the first and second outer seat sections 40*a*, 40*b* of the middle seat assembly 40 when in their passenger access configuration.

The raised rearward roof section 68 provides more headroom for the passengers of the middle and rear seat assemblies 40, 46. Due to the higher elevations of the second and third platforms 24, 26, a theater-style raised seating arrangement for the middle and rear seat assemblies is provided. The theater-styled raised seating arrangement allows the passengers in the middle and rear seat assemblies 40, 46 to have a better forward view through the vehicle windshield. The seat cushions in the front, middle, and rear seat assemblies 32, 40, 46 are such that the passengers in the middle seat assembly 40 are supported higher than passengers in the front seat assembly 32 and passengers in the rear seat assembly 46 are supported higher than passengers in the middle seat assembly 40. In other words, the standard seating reference point for a front seat passenger is lower than for a middle seat passenger and the standard seating reference point for a middle seat passengers is lower than for a rear seat passenger.

The seat arrangement of the present invention is uniquely and efficiently designed to be accommodated within a mid-size sport utility-type vehicle such as the Dodge® Durango® which has a vehicle height of approximately 73 inches and a vehicle width of approximately 72 inches. The length of the vehicle from bumper to bumper is approximately 194 inches while the axle-to-axle distance is approximately 116 inches. When the middle and rear seat assemblies 40, 46 of the present invention are in their cargo carrying position, approximately 88 cubic foot of cargo area is provided, which is larger than comparable sized vehicles. Furthermore, when the middle seat assembly 40 is in the passenger carrying position, approximately 51 cubic feet of cargo space is available with the rear seat assembly 46 in its cargo carrying position. The cargo carrying platform is at least as wide as the space between wheel wells 280 (approximately 45–49 inches).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A passenger vehicle, comprising:
   a tiered seating area arrangement having first, second, and third seat assemblies,
   said vehicle being formed with a floor having a first platform upon which said first seat assembly is mounted, a second platform upon which said second seat assembly is mounted, and a third platform upon which said third seat assembly is mounted,
   said third platform being higher than said second platform,
   said third seat assembly being positioned behind said second seat assembly, wherein a bottom section of said third seat assembly is mounted to said third platform such that it is capable of being articulated forward and down into a space between said second and third seat assemblies.

2. The vehicle according to claim 1, wherein said bottom section of said third seat assembly is capable of being articulated completely into a space between said second and third seat assemblies, such that a top surface of said bottom section is substantially at a same level as said third platform, said space being defined when said second and third seat assemblies are in a seated position.

3. A passenger vehicle, comprising:
a tiered seating area arrangement having first, second, and third seat assemblies,
said vehicle being formed with a floor having a first platform upon which said first seat assembly is mounted, a second platform upon which said second seat assembly is mounted, and a third platform upon which said third seat assembly is mounted,
said third platform being higher than said second platform,
said third seat assembly being positioned behind said second seat assembly;
wherein said third seat assembly is positioned behind said second seat assembly at a distance that is greater than a width of a bottom section of said third seat assembly;
wherein said bottom section of said third seat assembly is capable of being articulated forward and down into a space between said second and third seat assemblies;
wherein said bottom section of said third seat assembly is capable of being articulated completely into a space between said second and third seat assemblies, such that a top surface of said bottom section is substantially at a same level as said third platform; and
wherein said back section of said third seat assembly includes a flap extending across substantially an entire length of said back section, said flap having a height at least equal to a height of a headrest for said back section.

4. The vehicle according to claim 3, wherein said headrest for said back section of said third seat assembly is recessed sufficiently from a back surface of said back section of said third seat assembly to enable said flap to lay essentially flat over said headrest in a flipped over position.

5. A passenger vehicle comprising:
a. a passenger compartment having a floor including a first platform, a second platform and a third platform, said third platform being higher than said second platform;
b. a driver's seat disposed in said passenger compartment on said first platform;
c. a second seat assembly disposed in said passenger compartment on said second platform and including a seat bottom and a seat back movable between a first upright seating position and a second generally horizontal position;
d. a third seat assembly disposed in said passenger compartment on said third platform and including a seat bottom and a seat back movable between a first upright seating position and a second generally horizontal position, said second and third seat assemblies being configured and positioned so that when both of said seat backs are in said second position the upper surfaces thereof lie generally in a common substantially horizontal plane, and
e. wherein each of said seat backs has a generally flat upwardly facing load carrying surface when disposed in said second position.

6. A passenger compartment as claimed in claim 5, wherein said seat back of said second seat assembly substantially overlies said seat bottom of said second seat assembly when in said second position.

7. A passenger compartment as claimed in claim 5, wherein said seat back of said third seat assembly lies over a rear portion of said seat bottom of said third seat assembly when in said second position.

8. A passenger compartment as claimed in claim 7, wherein said seat bottom of said third seat assembly is movable from its normal seating position to a second position which is disposed lower than and forwardly of said normal position.

9. A passenger vehicle comprising:
a seating area having a first, second, and third seat assembly,
said passenger vehicle being formed with a floor having a first platform upon which said first seat assembly is mounted, a second platform upon which said second seat assembly is mounted, a third platform upon which said third seat assembly is mounted;
said third seat assembly disposed behind said second seat assembly, said third seat assembly having a seat bottom and a seat back, said seat bottom and said seat back being independently moveably mounted to said passenger vehicle, said seat bottom being moveable from a seating position with said seat bottom disposed in a horizontal manner to a second position by translating said seat bottom forward and downward independent of said seat back.

10. The passenger vehicle as set forth in claim 9, wherein said seat bottom while in said second position is disposed in a horizontal manner that is forward of and below said seat bottom when in said seating position.

11. The passenger vehicle as set forth in claim 9, wherein said seat back of said third seat assembly can be pivoted from a first upright seating position to a second load floor position wherein said seat back lies over a portion of said seat bottom.

12. The passenger vehicle as set forth in claim 9, wherein said seat bottom is translated substantially forward of and substantially below said third platform.

13. The passenger vehicle as set forth in claim 11, wherein said second seat assembly includes a seat bottom and a seat back, said second seat assembly is moveable from a first seating position to a second load floor position such that a rear surface of said seat back of said second seat assembly and a rear surface of said seat back of said third seat assembly generally lie in a common substantially horizontal plane when said second seat assembly and said seat back of said third seat assembly are in said second load floor position.

14. The passenger vehicle as set forth in claim 13, wherein said third platform is disposed higher than said second platform.

15. The passenger vehicle as set forth in claim 14, further comprising a fourth platform disposed rearward of and higher than said third platform, said fourth platform generally lies in a common horizontal plane with said rear surface of said seat back of said third seat assembly and said rear surface of said seat back of said second seat assembly when said second seat assembly and said seat back of said third seat assembly are in said second load floor position.

16. The passenger vehicle as set forth in claim 15, wherein said fourth platform includes a storage compartment formed therein and a storage compartment cover that generally lies in a common horizontal plane with said rear surface of said seat back of said third seat assembly and said rear surface of said seat back of said second seat assembly when said second seat assembly and said seat back of said third seat assembly are in said second load floor position.

17. The passenger vehicle as set forth in claim 15, wherein said rear surface of said seat back of said third seat assembly is coplanar with said fourth platform when in said second load floor position, said seat back of said third seat assembly capable of being disposed in said second load floor position while said second seat assembly is maintained in said first seating position.

18. The passenger vehicle as set forth in claim 16, wherein said second seat assembly is moveable to a third position wherein said seat bottom and said seat back are in a generally vertical position.

19. The passenger vehicle as set forth in claim 18, wherein said second platform is disposed higher than said first platform, said second seat assembly being disposed above said first platform while in said third position wherein said seat bottom and said seat back are in a generally vertical position.

20. A passenger vehicle comprising:
a seating area having a first, second, and third seat assembly,
said vehicle being formed with a floor having a first platform upon which said first seat assembly is mounted, a second platform upon which said second seat assembly is mounted, a third platform upon which said third seat assembly is mounted;
said third seat assembly disposed behind said second seat assembly, said third seat assembly having a seat bottom having a width and a seat back having a height, said height of said seat back being at least 50% greater than the width of said seat bottom.

21. A passenger vehicle as set forth in claim 20, wherein said height of said seat back is substantially equal to twice said width of said seat bottom.

22. A passenger vehicle as set forth in claim 21, wherein said seat back of said third seat assembly is pivotally attached to said vehicle a specified distance behind said second seat assembly, said specified distance is substantially equal to said height of said seat back.

23. A passenger vehicle as set forth in claim 22, wherein said second seat assembly includes a seat bottom and a seat back, said seat bottom of said third seat assembly being disposed higher than said seat bottom of said second seat assembly.

24. A passenger vehicle as set forth in claim 20, wherein said second seat assembly includes a seat bottom and a seat back, said seat back of said second seat assembly moveable from an upright seating position to a generally horizontal load floor position, said seat back of said third seat assembly is pivotally attached to said vehicle so that it can be pivoted downward such that a rear surface of said seat back generally lies in a common horizontal plane with said seat back of said second seat assembly when in said generally horizontal load floor position.

25. A passenger vehicle comprising:
a seating area having a first, second, and third seat assembly;
said passenger vehicle being formed with a floor having a first platform upon which said first seat assembly is mounted, a second platform upon which said second seat assembly is mounted, a third platform upon which said third seat assembly is mounted, and a fourth platform disposed behind said third platform;
said third platform being higher than said second platform and said fourth platform being higher than said third platform;
said second seat assembly having a seat bottom and a seat back moveable from a first upright position to a second load floor position such that a back surface of said seat back generally lies in a common horizontal plane with said fourth platform;
said third seat assembly disposed behind said second seat assembly, said third seat assembly having a seat bottom and a seat back that form a seating surface for a passenger in said passenger vehicle, said seat back moveable from a first upright position to a second position such that said seating surface of said seat back lies over a portion of said seat bottom while maintaining an upwardly facing surface substantially equal in height with said fourth platform.

26. A passenger vehicle, comprising:
a front seat assembly;
a middle seat assembly disposed behind said front seat assembly, said middle seat assembly including at least one seat bottom portion and at least one seat back portion pivotally mounted relative to said seat bottom portion, said at least one seat back portion being movable from an upright seating position to a generally horizontal load floor position, said at least one seat bottom portion and said at least one seat back portion being pivotable from said generally horizontal load floor position to a third position wherein said at least one seat bottom portion and said at least one seat back portion are in a generally vertical position;
a rear seat assembly disposed behind said middle seat assembly, said rear seat assembly having a seat bottom and a seat back, said rear seat assembly being movable from a seating position with said seat bottom in a horizontal position and said seat back in an upright position to a load floor position with said seat back pivoted downward over top of said seat bottom, such that a rear surface of said seat back of said rear seat assembly and a rear surface of said at least one seat back portion of said middle seat assembly generally lie in a common substantially horizontal plane when said at least one seat back portion of said middle seat assembly and said rear seat assembly are in said load floor position.

* * * * *